Oct. 19, 1948.   H. T. M. RICE   2,451,511
MEANS FOR MAKING WRENCH SOCKETS AND THE LIKE
Filed May 24, 1944                                       8 Sheets-Sheet 1

INVENTOR.
HENRY T. M. RICE,
BY
ATTORNEY.

Oct. 19, 1948.  H. T. M. RICE  2,451,511
MEANS FOR MAKING WRENCH SOCKETS AND THE LIKE
Filed May 24, 1944  8 Sheets-Sheet 2
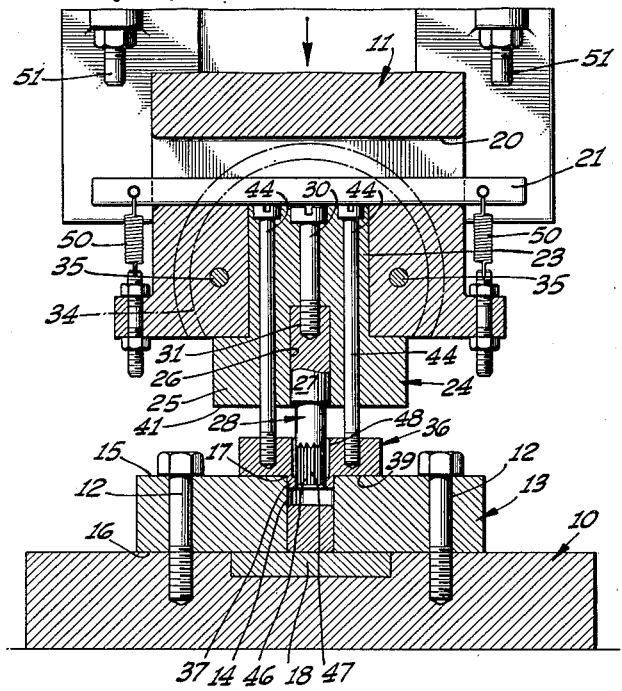
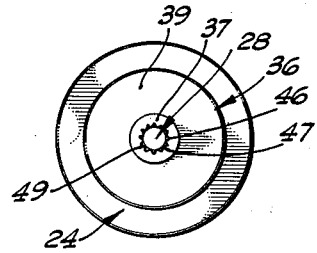
Fig.3.
Fig.4.
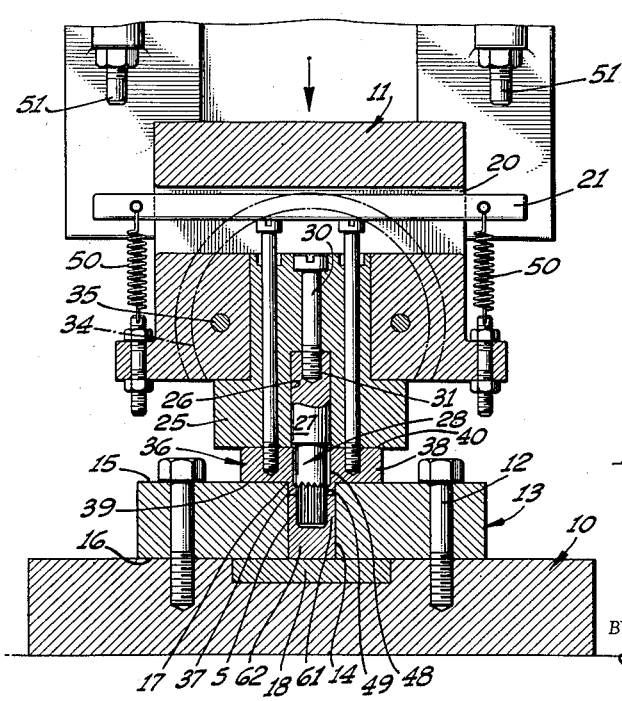
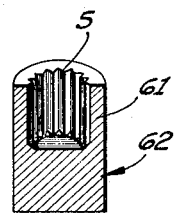
Fig.6.
Fig.5.
INVENTOR.
HENRY T. M. RICE,
BY
ATTORNEY.

INVENTOR.
HENRY T. M. RICE,

Oct. 19, 1948.  H. T. M. RICE  2,451,511
MEANS FOR MAKING WRENCH SOCKETS AND THE LIKE
Filed May 24, 1944  8 Sheets-Sheet 4

INVENTOR.
HENRY T. M. RICE,
BY
ATTORNEY.

Oct. 19, 1948.　　　　　H. T. M. RICE　　　　　2,451,511
MEANS FOR MAKING WRENCH SOCKETS AND THE LIKE
Filed May 24, 1944　　　　　　　　　　　　　　8 Sheets-Sheet 5

INVENTOR.
HENRY T. M. RICE,
BY
ATTORNEY.

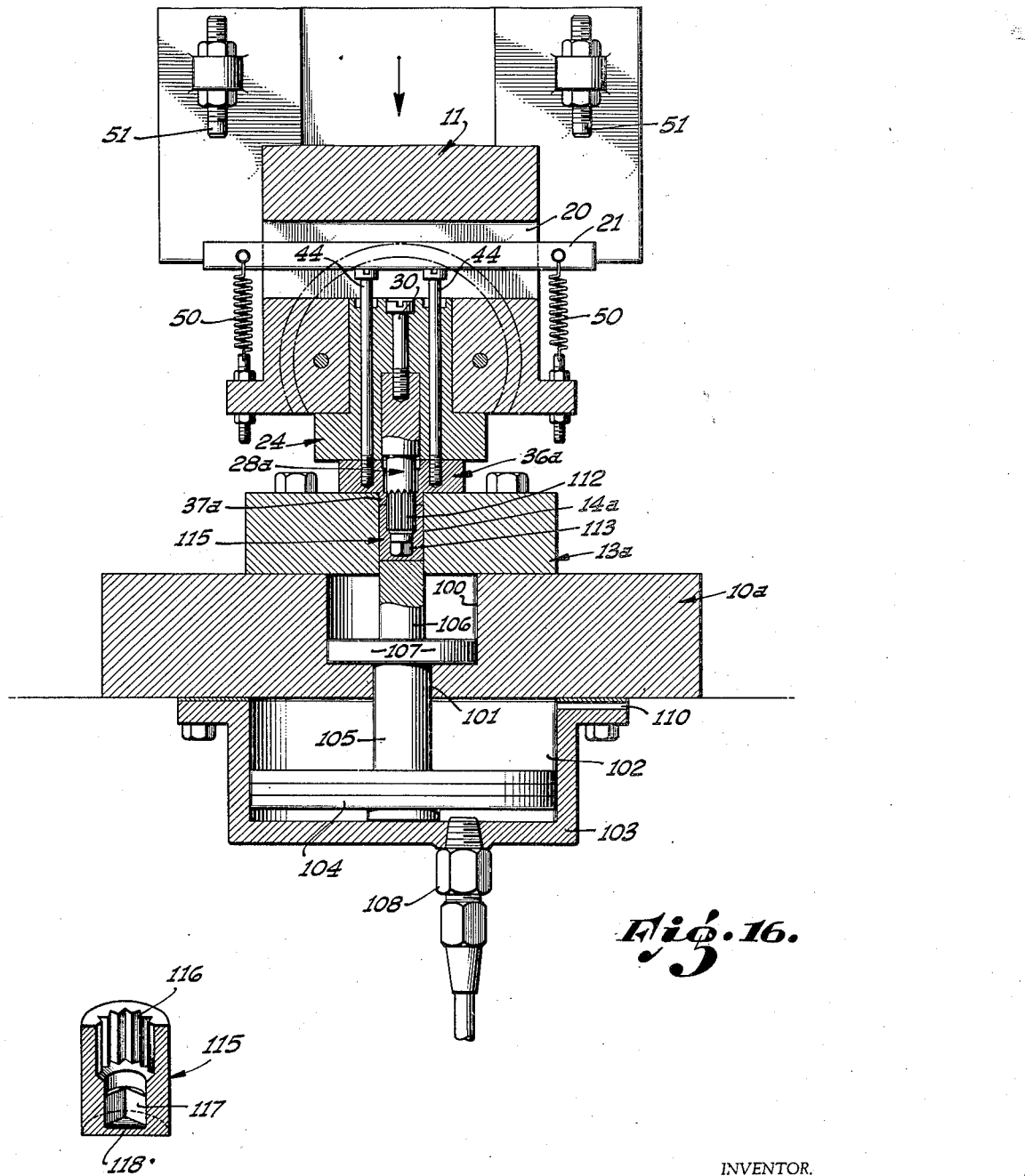

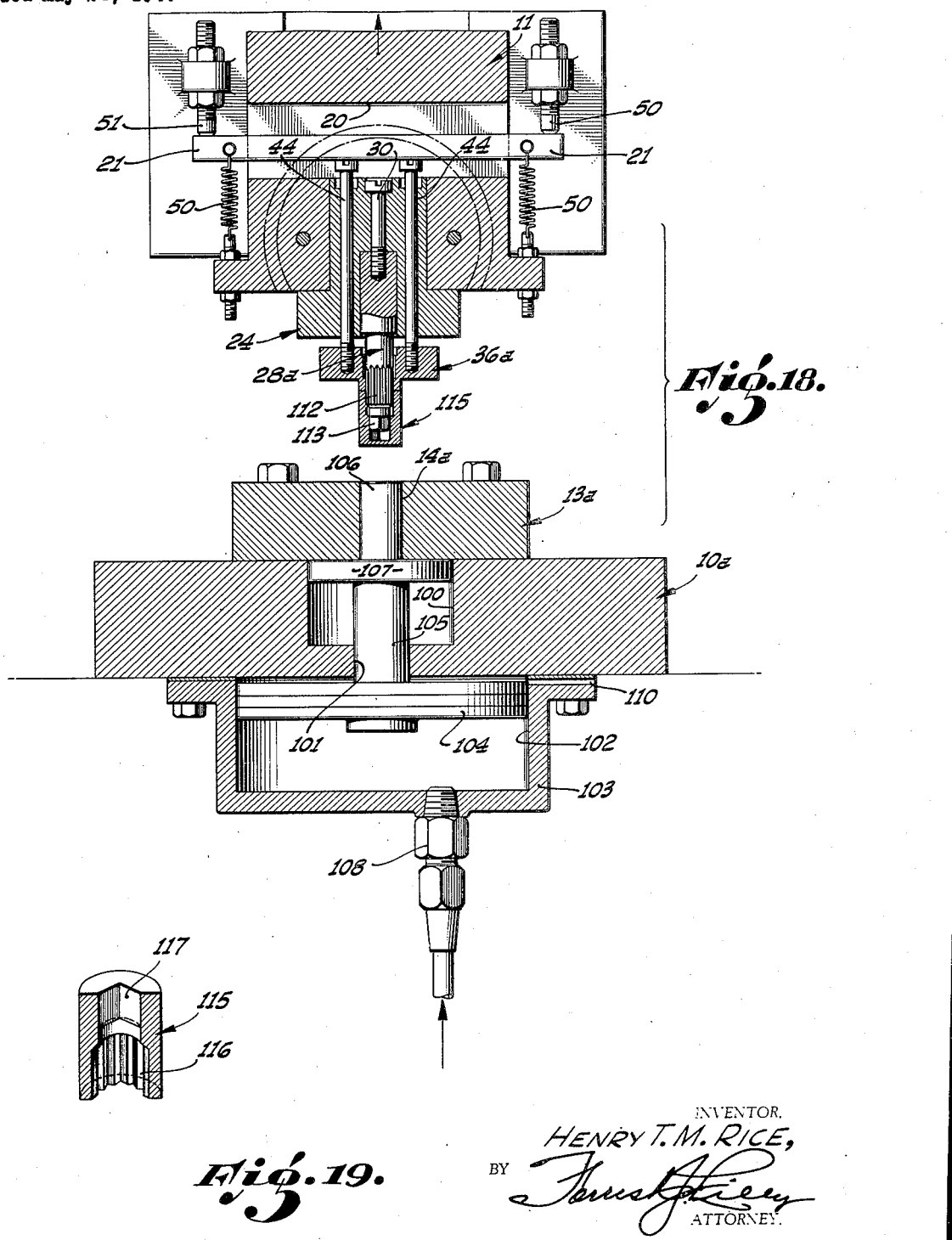

Oct. 19, 1948.  H. T. M. RICE  2,451,511
MEANS FOR MAKING WRENCH SOCKETS AND THE LIKE
Filed May 24, 1944  8 Sheets-Sheet 8
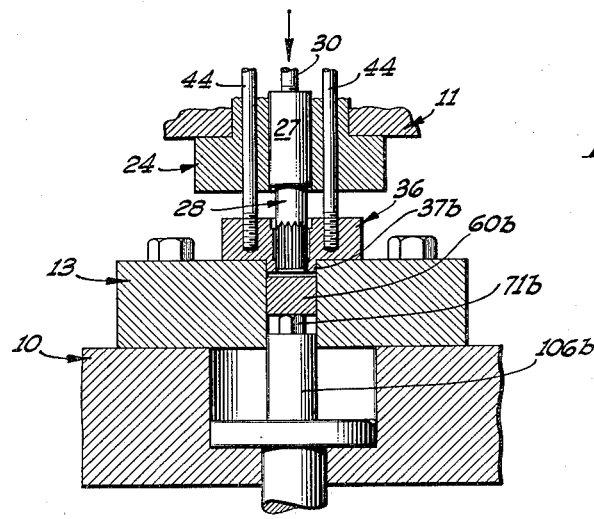
Fig. 20.
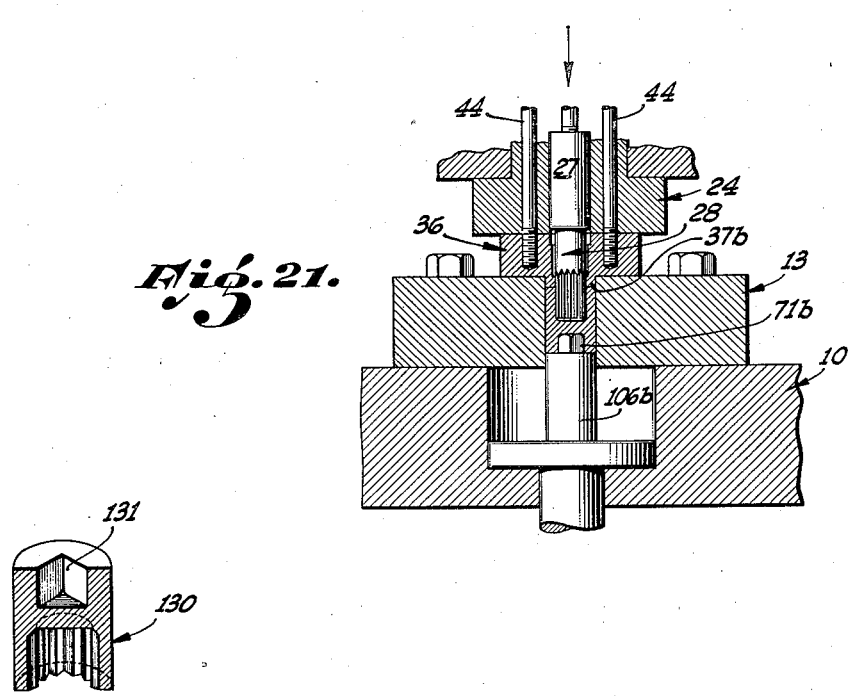
Fig. 21.
Fig. 22.
INVENTOR.
HENRY T. M. RICE,
BY
ATTORNEY.

Patented Oct. 19, 1948

2,451,511

UNITED STATES PATENT OFFICE 2,451,511

MEANS FOR MAKING WRENCH SOCKETS AND THE LIKE

Henry T. M. Rice, San Marino, Calif.

Application May 24, 1944, Serial No. 537,064

5 Claims. (Cl. 78—9)

This invention relates generally to means for manufacturing wrench sockets, universal sockets and like articles, and deals more particularly with the production of such articles by press or die forging apparatus.

Forging may be defined as the packing or kneading of a metal to close and weld voids in the original metal, and to compact and consolidate the crystalline structure, whereby the strength of the metal is greatly increased. The metal may be so packed or kneaded under repeated hammer blows, or by squeezing in a press under extreme hydraulic pressure. In press forging, there is a deep or "through" penetration of the metal by the extreme pressure exerted, and maximum refinement of the crystalline structure throughout the product results.

Despite the attractiveness of the press forging type of operation, however, wrench sockets and universal sockets are still, insofar as I am aware, invariably manufactured by the well-known process consisting of boring and broaching solid bar stock. This conventional process is wasteful of material, slow and expensive. Proposals have been made for manufacturing these wrenches by other methods, including the press or die forging type of process, but to the present time, none of these to my knowledge, has been able to displace the well-known standard but wasteful, slow and expensive process of boring and broaching.

Previous proposals for manufacturing these articles by the die forging process have invariably, insofar as I am aware, utilized the usual parting dies, which are accompanied by certain problems and difficulties not heretofore satisfactorily overcome. One disadvantage is the necessity for mechanism to close and open the die. Another has been the fact that such dies soon break down along the edges defining the parting planes. Parting dies also inevitably leave thin fins along the outside of the finished articles, and these become larger and more objectionable as the die wears and deteriorates. Another disadvantage is that the die closing and opening operations consume time, which imposes a limitation on the speed of the process.

The general object of the present invention is the provision of improved means for press forging wrench sockets, universal socket ends, and like articles from solid slugs or billets of metal.

A further object is the provision of press forging apparatus capable of completely forming such articles by a single stroke of the die punch.

The present invention is characterized in one important respect by the use of an integral or unitary "non-parting" die cavity block, so that the mechanism otherwise required for die closing and opening operations as well as the time consumption of such operations are eliminated at the outset. Moreover, and even more important, the internal die cavity surface does not suffer from the inherent weaknesses of parting planes, and stands up well in service. Additionally, of course, the fins along the outside of the finished article are eliminated.

Using a non-parting die, the die cavity necessarily extends straight into the die block, without undercut, and a feature of the invention is the provision of a closure means for closing the annular space in the upper or outer end of the die cavity around the die punch during the working portion of the die punch stroke. Another feature is the subsequent use of this same closure means to strip the article from the retracted die punch.

The present invention, as hereinbefore indicated, involves the use of a die cavity and die punch to press forge a wrench socket or the like from a billet of metal. However, while the principal mechanical working of the metal comes under the heading of forging, other types of metal working are involved. Thus, while the advancing die punch press forges the entirety of the metal, a certain portion of the metal "flashes" around the outside of the punch in a direction contrary to the advancing die punch movement, and this "flash," which is to form the side wall of the socket, finally engages and is "molded" by an inserted annular die closure. And in one form of the invention, another portion of the metal is flashed or extruded in the reverse direction, i. e., in the same direction as the advancing die punch, around the outside of an insert mounted in the inner end of the die cavity, so as to form another wall portion whose inner surface conforms to the cross-section of such insert. Thus the process of the present invention comprises press forging, flashing, molding, and, in some instances, a reverse flashing or extrusion.

With this preliminary discussion in mind, the invention itself, as well as various additional objects, features and advantages not heretofore mentioned, will appear and be understood from the following detailed description of certain typical illustrative embodiments thereof. For this purpose, reference is directed to the accompanying drawing, wherein:

Fig. 3 is a detail view in accordance with arrows 3—3 in Fig. 1.

Fig. 4 is a figure similar to Fig. 2, but showing the parts in a subsequent operating position, in which a die closure element has descended to close the die cavity;

Fig. 5 is a view similar to Fig. 4, but showing the die punch as having descended to complete the forging operation;

Fig. 6 is a perspective view of the article formed by the press;

Fig. 16 is a view similar to Fig. 15, but showing a subsequent operating position, wherein the product has been completely formed;

Fig. 17 is a perspective view of the product resulting from the press forging operation illustrated in Fig. 16;

Fig. 18 shows a subsequent operating position, illustrating the method of stripping of the product from the die punch and illustrating also the operation of an ejecting mechanism;

Fig. 19 shows the product subsequent to shearing out its end wall in conformity to the squared socket press forged therein;

Fig. 20 is a view similar to a portion of Fig. 16, but showing a further modification;

Fig. 21 shows the embodiment of Fig. 20 in a subsequent operating position, at the completion of the press forging; and Fig. 22 shows the press forging product resulting from the embodiment of Figs. 20 and 21.

Figure 1:
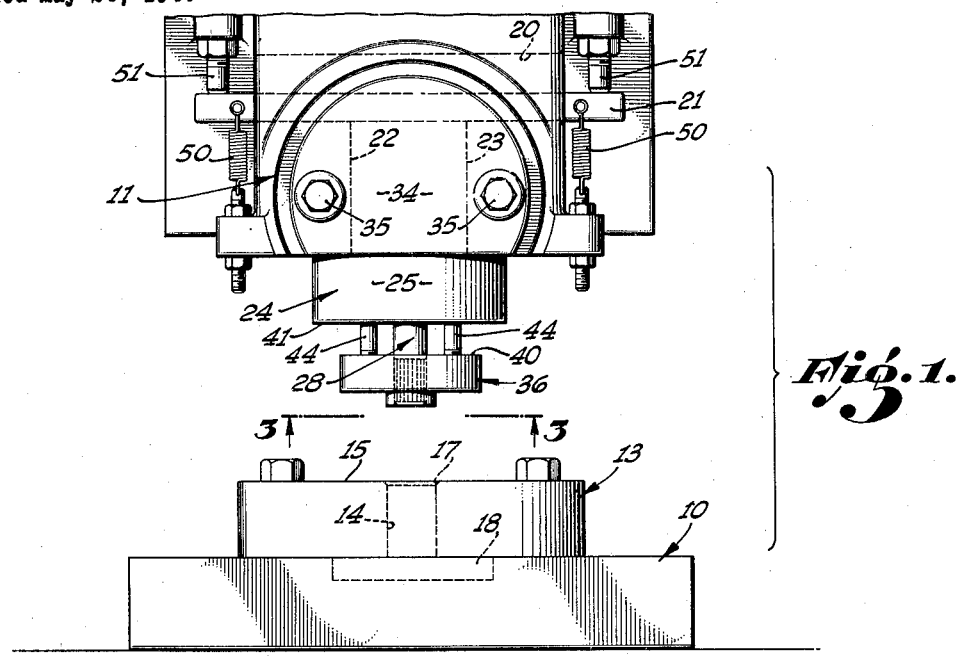
Fig. 1 is a fragmentary front elevational view of a hydraulic press, showing the upper portion of the stationary bed, and the lower portion of the vertically movable plunger head, the plunger head being shown at the top of its stroke, just before descending.

With reference first to Figs. 1 through 6, I will first describe the forging of a socketed product, which may be taken as typical of the practice of the present invention. The socketed product illustrated by these figures is not necessarily a finished wrench socket, nor a universal socket, nor necessarily any other specific finished tool, but is to be taken merely as representative of various socketed press forged products such as may be formed by the practice of the present invention. Additional procedures whereby a finished wrench socket or universal socket may be formed will be more particularly described hereinafter.

In Figs. 1 through 7, the numerals 10 and 11 designate, respectively, the horizontal bed and vertically movable plunger head of a hydraulic press, which may be generally of conventional design. Secured to bed 10, as by screws 12, is a one-piece or nonparting die cavity block 13, formed with a die cavity 14, which in the present instance extends straight through from the upper horizontal face 15 of the block to the lower face 16 thereof, without interruption excepting for a slight chamfer 17 preferably formed at its mouth. This die cavity 14 may be of any desired cross-sectional contour, though it is preferably and usually cylindrical. While the die cavity is here illustrated as of substantially equal diameter at the upper and lower surfaces 15 and 16 of the die block, there is nothing to prevent the use of a convergence, if desired, from surface 15 toward surface 16, and as a matter of fact a slight taper will facilitate extraction of the finished product from the die. However, it is essential that the cavity be of a nonundercut character, i. e. that its cross-sectional dimensions nowhere exceed the dimensions of its mouth, since otherwise extraction of the product through the mouth of the die cavity would be an impossibility. The die block 13 is of course formed of suitably hardened steel, and an insert disc 18 of similar steel is mounted in a countersunk position in the top of the bed 10, directly below the cavity 14, so as to define the bottom of said cavity.

The vertical plunger head 11 is provided with the usual lateral cross-slot 20 for a knock-out bar 21, and below slot 20 with a vertical bore 22 opening through its lower end. Received in this bore is the reduced cylindrical shank 23 of a die punch holder 24, an enlarged head 25 at the lower end of the member 24 being engageable with the under side of the head 11. Extending upwardly into the member 24 is a bore or socket 26 adapted to receive the shank 27 of a die punch generally designated by numeral 28. This die punch is secured to the member 24 by means of a screw 30 reaching downwardly from the upper end of the shank 23, and engaging a screw threaded socket 31 in the end of the punch shank 27. As shown, the head of the screw 30 is preferably countersunk into shank 23. The shank 23 is removably secured in position in the plunger head 11 by means of a removable insert clamp block 34 secured to the plunger head as by means of screws 35, and designed to clampingly engage the shank 23. Such construction is more or less conventional and will be readily understood.

Also carried by plunger head 11 is a member 36 functioning first, as a closure for the upper end of the die cavity, and second, as a stripper for removing the forged article from the die punch. This member 36 comprises, in the present embodiment of the invention, a lower annular part 37 which is receivable, with a close sliding fit, in the mouth or upper end portion of the cylindrical die cavity 14, and an enlarged upper disc-like part 38 whose horizontal lower surface 39 is engageable with the top face 15 of the die block when the closure part 37 has been fully inserted within the die cavity 14, and whose horizontal upper surface 40 is adapted to be engaged by the horizontal lower face 41 of the die punch holder 24 in the lowermost position of the latter, i. e., when the die punch is fully home (Fig. 5). The member 36 thus constitutes a rigidly held upper closure for the die cavity during final application of extreme forging pressure. As here shown, the member 36 is carried by a pair of long screws 44 which reach downwardly through the die punch holder 24, the heads of said screws being countersunk into the upper end of the latter, and the lower ends of the screws being screwed into the disc 38, in the manner clearly appearing in Fig. 2. The screws 44 are of such length that the member 36 is normally suspended in a position spaced somewhat below die punch holder 24, and the screws 44 are slidable in said holder 24 to permit relative movement between the die punch holder 24 and the member 36. The die punch may have any desired cross-sectional shape, such as square, fluted, etc. It is, however, here shown as provided with a conventional type of alternating ridges 46 and grooves 47, as appears for instance in Fig. 3. Assuming the socket to be formed by the die punch is to be intended to fit either a square or hexagonal bolt head or nut, the die punch will preferably be given what is known as a "twelve-point" form; that is, there will be twelve ridges 46 and twelve grooves 47. The disc-like part 38 of member 36 is provided with a bore 48 of sufficient diameter to pass the die punch with clearance, but the annular die cavity closure part 37 is formed with an opening 49 complimentary in shape to the cross-section of the die punch, and dimensioned to receive the die punch with a close working fit.

The knock-out bar 21 is normally held down to the lower end of the slot 20 by means of coil springs 50 connected between its ends and the lower end portion of the plunger head 11. In the course of upward movement of the plunger head, the two ends of the knock-out bar engage a pair of stationary stop screws 51 (Fig. 7), which limit the upward movement of the bar 21 and arrest the same while the plunger head is still rising. This knock-out bar 21 passes over and engages the heads of the two screws 44 to perform a function which will presently appear.

Figure 2:
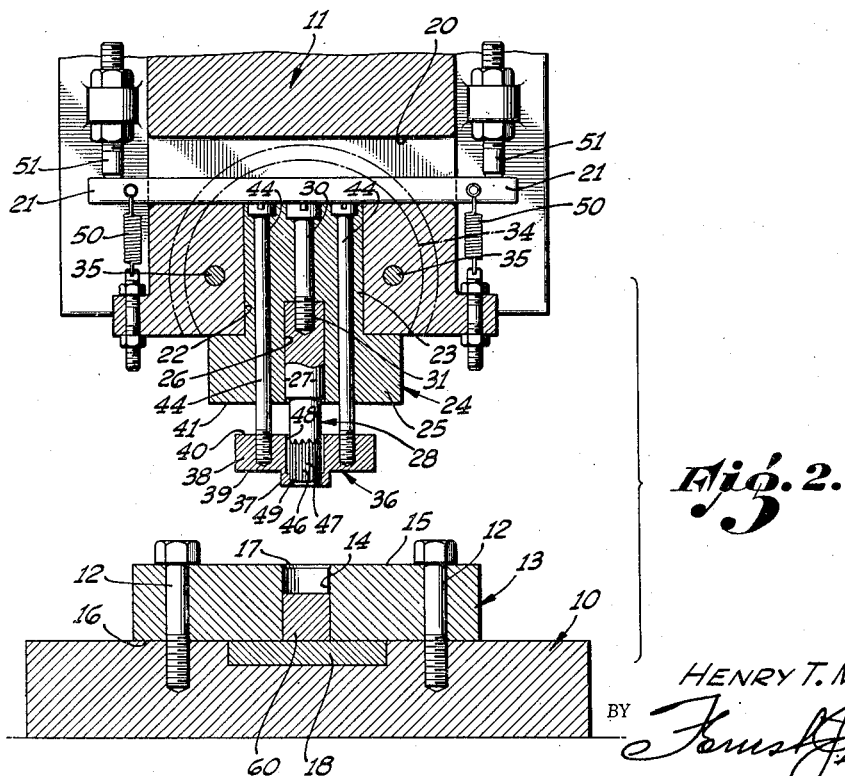
Fig. 2 is a vertical medial section of the press shown in Fig. 1.

Fig. 2 shows the press in the preliminary position, a billet of metal 60, preferably heated to a forging temperature, having been deposited in the die cavity 14. The plunger head 11 then descends, shortly reaching the position of Fig. 4, in which the die closure element 37 has been inserted within the mouth of the die cavity and the disc-like member 38 has come into engagement with the upper face of the die block. With continued downward movement of plunger head 11, the die punch holder 24 will then slide downwardly on the screws 44, the heads of which, remaining stationary, arrest downward movement of knock-out bar 21, so that the latter moves relatively upwardly in the slot 20 of the still descending plunger head. The springs 50 are of course stretched out at this time. The die punch thus moving downwardly, engages and is forced into the billet, forming a socket s, and causing the metal of the billet to flash upwardly around the punch, in a direction of travel contrary to that of the punch. This "flash," designated by numeral 61 in Fig. 5, flows upwardly until it meets and is moulded to form a smooth or finished rim by the lower annular part 37 of the die closure member 36. The lower end of plunger head 25 being at this time in engagement with said die closure member 36, so that the latter is rigidly held closed, a pressure of the order of 300,000 pounds per square inch may be applied, and the metal of the original billet, being entirely confined under this pressure, is press forged to the form of the socketed element 62 illustrated in Fig. 6. It will also be evident that the engagement of the member 36 by the plunger head positively limits the downward travel of the latter. As will be apparent, the flash 61 forms the side wall of the socket, which is ridged and grooved in a conformation complementary to the shape of the die punch.

Figure 7:
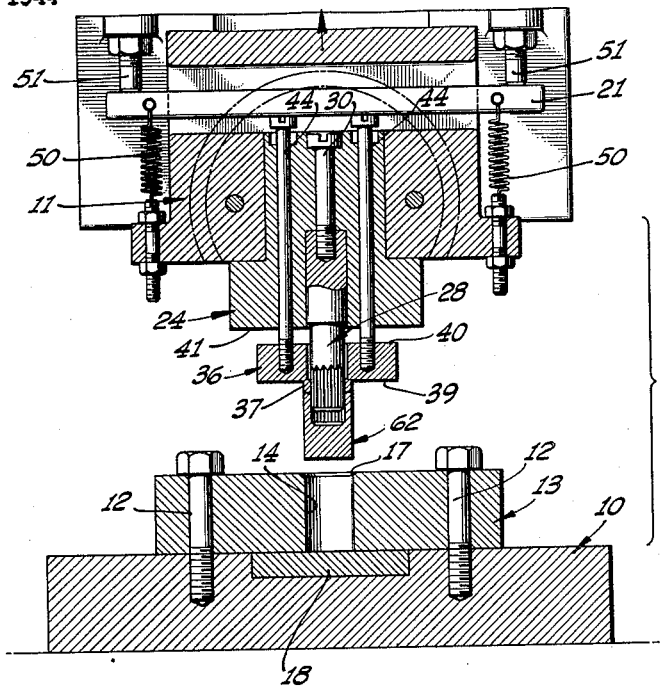
Fig. 7 is a view similar to Figs. 2 through 5, but showing the parts in a subsequent position, in which the forged article is being stripped from the die punch.

Fig. 7 shows a subsequent stage, the plunger head having been elevated nearly, but not quite, to its initial position, and the knock-out bar 21 having come into engagement with the stop screws 51, and therefore, through its engagement with the screws 44, having arrested upward movement of the die closure member 36. It will be understood that the socketed product 62 will tend to seize onto the die punch, and will be elevated with the latter when the plunger head moves up. When, however, the member 36 is arrested in its upward movement by the engagement of knock-out bar 21 with stop screws 51, the annular element 37, which will be observed to be in contact with the upper end of socketed member 62, will strip the latter off the punch as the punch continues to rise with the plunger head. It will be understood that by the time the plunger head has been elevated the remainder of the distance from the position of Fig. 7 to that of Fig. 2, the socketed member 62 will have been stripped entirely from the punch.

Figure 8:
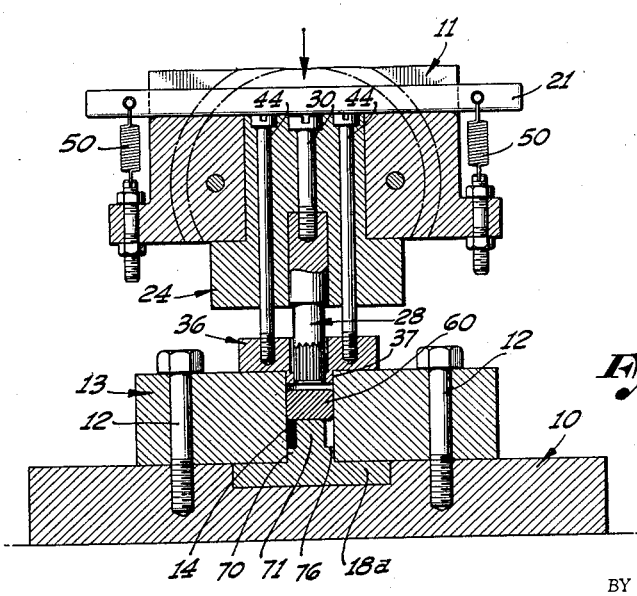
Fig. 8 is a view similar to Fig. 4, but showing a modified arrangement for forging an article having a socket in each end.
Figure 9:
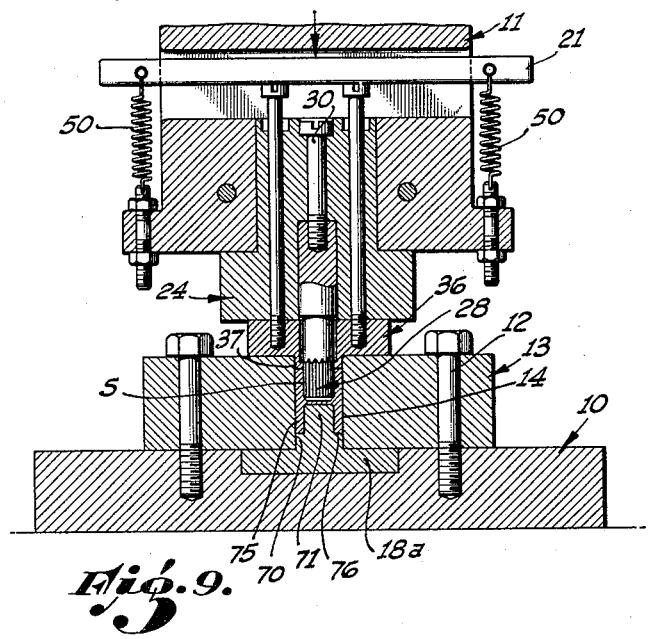
Fig. 9 is a view of the parts shown in Fig. 8 but at a subsequent operating position, showing the completion of the article.
Figure 10:
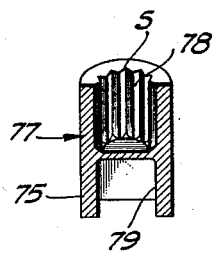
Fig. 10 is a perspective view of the article forged in the apparatus of Figs. 8 and 9.
Figure 11:
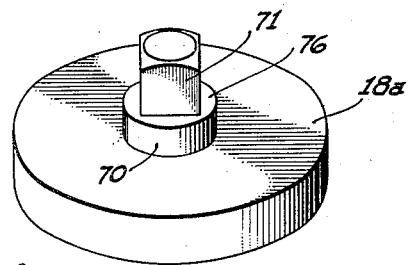
Fig. 11 is a perspective detail of a die insert employed in the apparatus of Figs. 8 and 9.

Figs. 8, 9 and 11 show a modification by which sockets may be formed simultaneously in the two ends of the product. The die and plunger structure in this instance is generally the same as that appearing in Figs. 2 through 7, and corresponding parts will be designated by similar reference numerals. In Figs. 8 and 9, however, a presently described die cavity insert is positioned at the inner end of the die cavity.

Let it be assumed that it is desired to press forge a wrench socket having a "twelve-point" nut or bolt head receiving socket in one end, and a squared handle receiving socket in the other. In such case, the upper side of bed plate insert disc, designated in this instance by numeral 18a, is formed with a center insert base or abutment in the form of a disc 70 adapted to fit snugly within the lower portion of the die cavity 14, and upstanding from this disc 70 is a squared insert element 71 dimensioned in conformity to the desired squared socket to be formed.

Fig. 8 shows the plunger head descended to a position wherein the die closure element has been seated in the upper end of the die cavity, but in which the die punch has not yet engaged the heated billet 60. Continuing on downwardly from the position of Fig. 8, the die punch is forced into the billet, forming the twelve-point socket s, and causing a flash flow of metal upwardly around the punch until it meets the die closure element 37 as before, and at the same time causing a reverse or forward flash or extrusion 75 downwardly around the outside of the squared insert element 71. This extrusion flow 75 finally engages and is limited by the upwardly facing shoulder 76 provided at the juncture of insert element 71 and disc 70. The heavy pressure exerted, again of the order of 300,000 lbs. per square inch, and the die being entirely closed, the article, designated generally by numeral 77, is press forged to have at one end a twelve-point socket 78, formed by the die punch, and a squared socket 79, formed by the insert 71. The upper and lower ends of the side walls of the product are moulded to a smooth finish by engagement against the die closure 37 and shoulder 76. Thus the finished wrench socket of Fig. 9 is press forged from a solid billet in one step.

Figure 14:
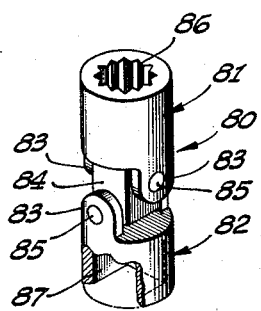
Fig. 14 is a perspective view of a universal socket tool utilizing forged socket elements of a type capable of being produced by the present invention.

In Fig. 14 I have illustrated a type of universal socket tool, designated generally by numeral 80.

This tool comprises two socketed elements 81 and 82, each formed with a pair of furcations 83 which receive opposite ends of a connecting block 84, and which are pivotally connected to said block by pivots 85 arranged at right angles to one another. The upper element 81 is illustratively shown as formed with a twelve-point bolt head or nut receiving socket 86, and the lower end with a squared handle receiving socket 87. Such a tool is well-known, and as understood, the sockets in the two elements 81 and 82 may be as shown, or otherwise. For instance, both sockets might be squared, or both might be of twelve-point contour. There will now be described a procedure in accordance with the invention for forming a socket element for such a universal joint wrench tool.

Figure 13:
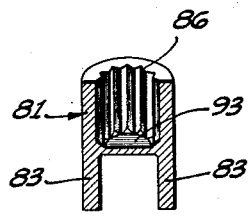
Fig. 13 is a perspective of the product resulting from use of the die insert of Fig. 12.
Figure 12:
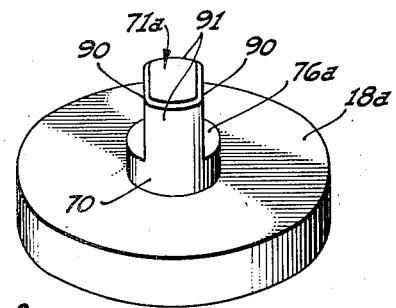
Fig. 12 is a modified die insert adapted to be employed in the apparatus of Figs. 8 and 9.

Referring again to Figs. 8 and 9, and this time to Fig. 12, the die insert structure shown in Fig. 12 is in this instance substituted for the previously described die insert structure of Fig. 11. As clearly appears in Fig. 12, the insert disc 18a again has formed integrally with its upper face a reduced disc element 70 adapted to be snugly received in the lower portion of the die cavity, and rising from disc element 70 is an insert element 71a, having two opposite flat faces 90, and two opposite curved surfaces 91 which conform to and snugly fit against the cylindrical walls of the die cavity 14. The operation is similar to that previously described in connection with Figs. 8, 9 and 11, but this time the downward flash or extrusion of metal occurs only along the two flat faces 90, being received in the two channels defined at the sides by the two surfaces 90 and the side walls of the cavity 14, and at the bottom by the shoulder 76a. The resulting product, shown at 81 in Fig. 13, has the desired furcations 83, a twelve-point socket 86, and a horizontal wall or partition 93 between the socket 86 and the furcations 83.

It will readily be understood how, by the substitution of a squared die punch for the 12-point punch 28, and of course the corresponding substitution of an appropriate die closure member 36, the lower socket element 82 of Fig. 14, having the squared socket 87, may be produced.

Reference is now directed to Figs. 15 through 19, showing certain further modifications within the scope of the invention. The die and plunger head structure is generally similar to that of the previously described embodiments, and corresponding parts will accordingly be designated by similar reference numerals, but with the subletter *a* annexed in the case of the embodiment of Figs. 15 through 19. It will be unnecessary to repeat a description of the plunger head and die structure at large, and the detailed description will accordingly be principally confined to those portions of the plunger head and die structure of Figs. 15 through 19 which differ essentially from the embodiment of Figs. 1 through 7.

Some difficulty may sometimes be experienced from a tendency of the forged product not only to seize onto the die punch, but also to adhere to the walls of the die cavity, with the result that the hardened punch may be pulled in two during its retraction from the die cavity. The embodiment of Figs. 15-19 includes an ejecting mechanism, preferably air operated, for freeing the product from the die cavity so that it will be removed easily with the punch.

Referring now to Figs. 15 through 19, the horizontal bed 10a is formed, directly in axial alignment with die cavity 14a, with a bore 100 that extends downwardly into the bed from the upper face thereof, and is continued on downwardly to the lower face thereof by a reduced bore 101. The latter opens into a piston chamber 102 defined by a short flanged cylinder 103 secured to the underside of bed 10a. A piston 104 works within cylinder 103 and carries a plunger rod 105 extending upwardly through reduced bore 101 and having an upper reduced ejector plunger section 106 which is slidably received in the cylindrical die cavity 14a. At the base of a reduced plunger rod section 106 is an annular head or flange 107 which works in bore 100. When the piston 104 is in its lowermost position, head 107 is at the bearing shoulder formed at the juncture of bores 100 and 101, and the upper extremity of plunger rod section 106 is received a short distance within die cavity 14a, thus serving to define the bottom of the die cavity. When air under pressure, from any suitable source and under any desired control, is admitted to the lower end of cylinder 103 via air inlet connection 108, an upward pressure is exerted on piston 104, tending to move said piston, the plunger 105 and the ejector 106 toward the uppermost position shown in full lines in Fig. 18. To permit such upward movement of piston 104, an air bleeder passage 110 is provided in the upper portion of cylinder 103.

The die punch 28a in the embodiment of Figs. 15 through 19 is shown as having a section 112 of fluted or "12-point" cross-sectional conformation, and a reduced, squared tip section 113 depending therefrom.

Figure 15:
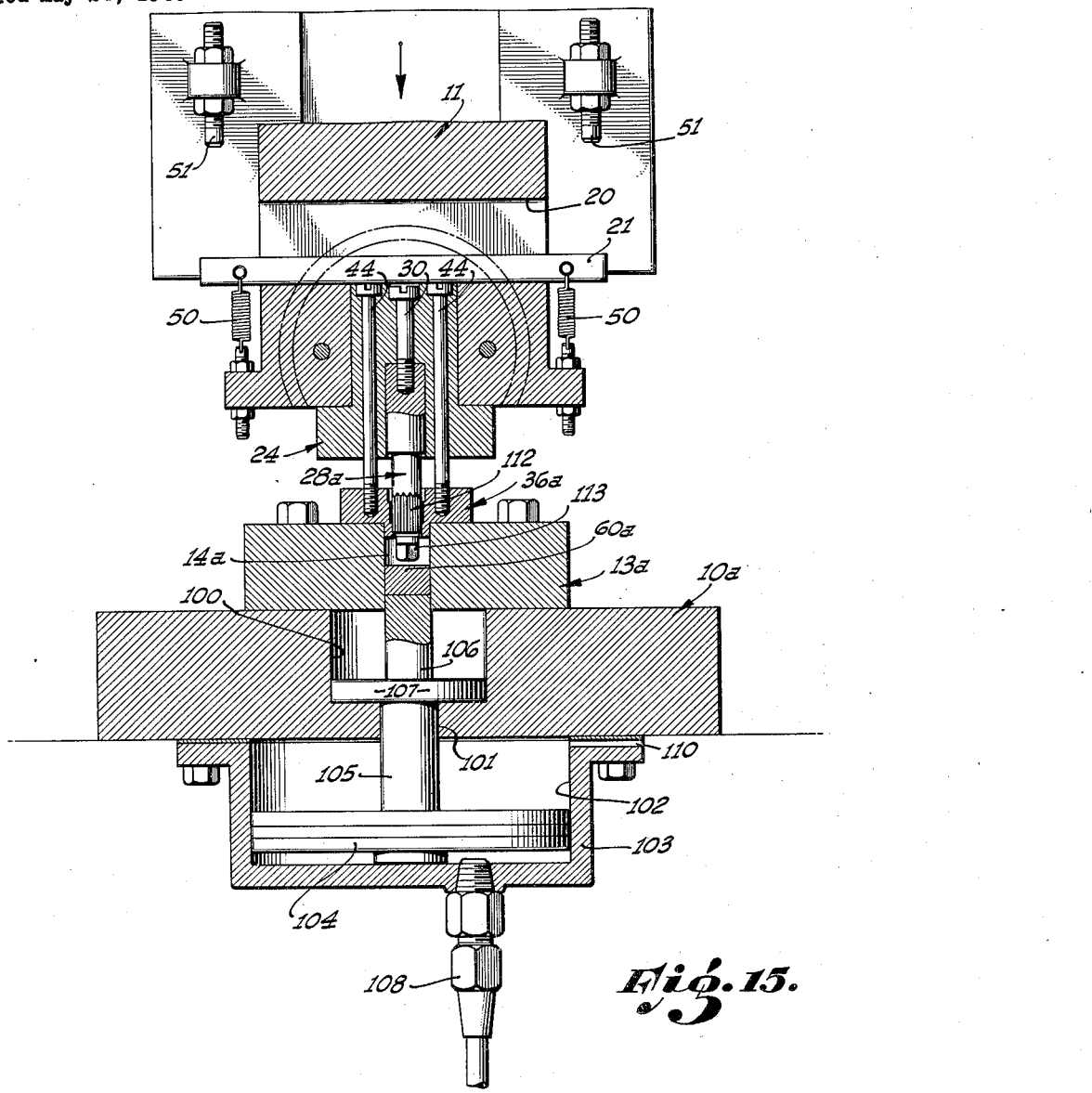
Fig. 15 is a vertical medial section of a modified form of the invention, the view and the operating position shown being similar to Fig. 4.

Fig. 15 shows the plunger head as having descended to a position in which the upper end of the die cavity has been closed by closure member 36a, which has been arrested by engagement with die block 13a, but before engagement of the die punch with billet 60a. Continued downward movement of the plunger head below the position of Fig. 15 then forces squared punch tip element 113 and the fluted punch section 112 downwardly into the billet, as to the position of Fig. 16, the metal of the billet flashing upwardly around the die punch into engagement with the annular die closure element 37a, and the tip 113 of the punch traveling substantially or nearly entirely through the billet.

The resulting press forged product is designed generally at 115 in Fig. 17 and will be seen to be of cylindrical external conformation with a "12-point" socket 116 extending inwardly from one end, and with a squared socket 117 extending further inwardly from the inner end of socket 116, a thin wall of material 118 remaining between the inner end of socket 117 and the adjacent end of the product. To complete the wrench, this remaining wall 118 may easily be sheared out by any conventional shearing procedure, producing the finished result shown in Fig. 19, in which the squared socket 117 is shown as extending entirely through the end of the device. This shearing operation may obviously be performed with a square punch in a suitable press, and since such procedure is entirely conventional, as well as being outside the scope of the invention, no detailed explanation or illustration thereof is deemed necessary herein. Of course, by simply lengthening the squared section 113 of the punch, the squared socket 117 might have been forced entirely to or through the end of the product 115. However, a cleanly defined end opening for the squared socket might not readily be achieved in this matter, and it is accordingly preferred to terminate the movement of the die punch just above the lower end of the product, and then shear out the remaining wall portion 118 at a subsequent time.

The parts being in the position of Fig. 16, air under pressure is introduced to the lower end of chamber 102, and exerts an upward force on piston 104 and hence on ejector 106. As previously mentioned, the main tendency is for the press forged product 115 to seize onto the die punch, but there is also a tendency for it to cling to the walls of the die chamber 14a. This latter tendency is overcome by the air pressure operated ejector plunger 106, which exerts a pressure against the underside of the product 115 to break the latter loose from the walls of the die chamber 14a at the same time that the plunger head carrying the die punch is elevated. Preferably, introduction of air to chamber 102 is begun just before the die punch reaches the lower end of its stroke, so that the pressure can be built up sufficiently to act in freeing the product 115 from the die cavity immediately that the die punch is lifted. This introduction of air pressure to chamber 102 may of course be under the control of a suitable valve, operated in the proper timed relation with the movement of the plunger head.

Fig. 18 shows the parts in a subsequent operating position, the piston 104 and ejector plunger 106 being shown in their uppermost position, having already acted to assure freeing of the product 115 from the die cavity. The plunger head is in a position corresponding to that of Fig. 7, and it will be understood without further description how the product 115 will be stripped the remaining distance off the punch during the remainder of the upward travel of the plunger head back to a preliminary position corresponding to that shown in Figs. 1 and 2.

It will of course be understood that the ejecting mechanism of Fig. 15 through 19 may be utilized in connection with the embodiments of Figs. 1 through 9, if desired. For instance, Figs. 20 and 21 show the use of the ejector mechanism in a case corresponding to that of Fig. 9. Parts in Figs. 20 and 21 are identified by reference numerals similar to those used in Figs. 1 to 7, but with the sub letter b annexed. Here, the ejector plunger 106b, understood to correspond to the ejector plunger 106 of Figs. 15 through 19, carries at the top a squared insert element 71b, corresponding to the insert element 71 of Fig. 9. Movement of the die punch, which is of the same type as that of Fig. 9, from the position of Fig. 20 to that of Fig. 21, results in forcing the metal of the billet 60b upwardly around the die punch into engagement with the annular die closure element 37b, and movement of the metal downwardly around squared insert element 71b into engagement with the upward end of the ejector plunger 106b at the base of element 71b, as clearly shown in Fig. 21. Upward pressure on the ejector plunger 106b, exerted by means of some instrumentality such as the piston arrangement of Figs. 15 through 19, then aids in freeing the forged product from the walls of the die cavity so that it may easily be elevated with the punch. The resulting socket wrench is shown at 130 in Fig. 22, and has a square socket 131 in one end, and a 12-point socket in the other.

Thus, by the die forging means and methods now described, wrench sockets, universal sockets, and the like, may be manufactured by press forging in simple and inexpensive apparatus, at high speed, and consequently at low cost.

I have herein illustrated and described certain particular methods and apparatus as illustrative of the invention; it is to be understood of course that the invention is not to be construed as limited to the specific embodiments herein described, which are for illustrative purposes only, and are subject to substantial modification without departing from the spirit and scope of the invention.

I claim:

1. Press forging apparatus for forming socketed articles from billets, comprising: a die block having a non-undercut die cavity sunk therein, a die punch of smaller cross-sectional size than said die cavity, a reciprocable plunger head adapted to carry said die punch and to advance said die punch into and retract it from said die cavity, a die closure and stripper member having an aperture slidably receiving said punch, and being applicable to said die block to close said die cavity around said punch, said member being carried by said plunger head in a position between the plunger head and the block but being arranged for limited movement relative to the plunger head in a direction parallel to the reciprocative movement of the plunger head, spring means normally yieldingly supporting said member in a position advanced beyond plunger head, and stop means limiting travel of said member with said plunger head to a predetermined position short of the terminal position of the plunger head in its retractive travel from the die block, said member being engageable with and arrested by said die block at a predetermined position in the travel of the plunger head and punch toward the die block, in which position it functions as a die closure, and being arrested by said stop means during retractive movement of the plunger head and punch to engage and strip off the product seized onto the die punch.

2. Press forging apparatus for forming socketed articles from billets, comprising: a die block having a non-undercut die cavity sunk therein, a die punch of smaller cross-sectional size than said die cavity reciprocable into and out of said die cavity, a reciprocable plunger head adapted to carry said die punch toward and from said die block, a die closure and stripper member yieldingly carried by said reciprocable plunger head, said die closure and stripper member having an aperture slidably fitting and passing said die punch, said member being engageable with and arrested by said die block at a predetermined intermediate position in the travel of said plunger head and punch toward said die block, and stop means for said member engageable thereby at a predetermined intermediate position in the travel of said plunger head, punch and member from said die block whereby said member is arrested and strips the product from the still traveling die punch.

3. Press forging apparatus for forming socketed articles from billets, comprising: a die block having a non-undercut die cavity sunk therein, a die punch of smaller cross-sectional size than said die cavity, a reciprocable plunger head adapted to carry said die punch and to advance said die punch into and retract it from said die cavity, a die closure and stripper member having an aperture slidably receiving said punch, and being applicable to said die block to close said die cavity around said punch, said member being carried by said plunger head in a position between the plunger head and the die block but being arranged for limited movement relative to the plunger head in a direction parallel to the reciprocative movement of the plunger head, spring means normally yieldingly supporting said member in a position advanced beyond plunger head, and stop means limiting travel of said member with said plunger head to a predetermined position short of the terminal position of the plunger head in its retractive travel from the die block, said member being engageable with and arrested by said die block at a predetermined position in the travel of the plunger head and punch toward the die block, said plunger head subsequently positively engaging and being arrested by said die closure member in engagement with said die block, whereby said member functions as a rigidly held closure for the die cavity and as a stop for the advancing plunger head, and said member being arrested by said first mentioned stop means during retractive movement of the plunger head and punch to engage and strip off the product seized onto the die punch.

4. Press forging apparatus for forming socketed articles from billets, comprising: a die block having a non-undercut die cavity sunk therein, a die punch of smaller cross-sectional size than said die cavity, a reciprocable plunger head adapted to carry said die punch and to advance said die punch into and retract it from said die cavity, a die closure and stripper member having an aperture slidably receiving said punch, and being applicable to said die block to close said die cavity around said punch, said member being carried by said plunger head in a position between the plunger head and the die block but being arranged for limited movement relative to the plunger head in a direction parallel to the reciprocative movement of the plunger head, and stop means limiting travel of said member with said plunger head to a predetermined position short of the terminal position of the plunger head in its retractive travel from the die block, said member being engageable with and arrested by said die block at a predetermined position in the travel of the plunger head and punch toward the die block, said plunger head subsequently positively engaging and being arrested by said die closure member in engagement with said die block, whereby said member functions as a rigidly held closure for the die cavity and as a stop for the advancing plunger head, and said member being arrested by said first mentioned stop means during retractive movement of the plunger head and punch to engage and strip off the product seized onto the die punch.

5. Press forging apparatus for forming socketed articles from billets, comprising: a die block having a non-undercut substantially parallel-sided die cavity sunk therein, a die punch of smaller cross-sectional size than said die cavity reciprocable into and out of said die cavity, a reciprocable plunger head adapted to carry said punch toward and from said die block, a die closure mounted on said plunger head and arranged for movement relative to the plunger head in a direction parallel to the reciprocative movement of the plunger head, yielding means normally holding said member in an advanced position relative to said plunger head, said die closure member being engageable with and stopped by said die block at a predetermined position in the course of travel of said plunger head toward said die block, and said die closure member having an extension receivable with a close sliding fit within an end portion of said parallel-sided die cavity as said member closely approaches and then engages said die block, said die closure and its said extension having an aperture slidably receiving said punch, said plunger head being adapted finally to positively engage said die closure element and hold it rigidly against said die block as said die punch reaches the limit of its forward travel.

HENRY T. M. RICE.

REFERENCES CITED

The following references are of record in the file of this patent:

UNITED STATES PATENTS

| Number | Name | Date |
|---|---|---|
| 869,476 | Beck | Oct. 29, 1907 |
| 1,258,414 | Jacoby | Mar. 5, 1918 |
| 1,315,010 | Culhane, P. J., Jr. | Sept. 2, 1919 |
| 1,595,588 | Tuttle | Aug. 10, 1926 |
| 1,640,964 | Schlaupitz et al. | Aug. 30, 1927 |
| 1,771,610 | Blakeslee | July 29, 1930 |
| 1,884,708 | Jeneson | Oct. 25, 1932 |
| 1,951,229 | Zeh | Mar. 13, 1934 |
| 2,001,902 | Engelbertz | May 21, 1935 |
| 2,024,286 | Handler | Dec. 17, 1935 |
| 2,182,922 | Heschel | Dec. 12, 1939 |
| 2,224,670 | Criley | Dec. 10, 1940 |

FOREIGN PATENTS

| Number | Country | Date |
|---|---|---|
| 387,526 | Great Britain | Feb. 9, 1933 |
| 459,020 | Great Britain | Dec. 31, 1936 |